(12) United States Patent
Horng

(10) Patent No.: US 8,207,641 B2
(45) Date of Patent: Jun. 26, 2012

(54) MOTOR HAVING RADIAL ADJUSTMENT AND BUFFER GAPS

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 323 days.

(21) Appl. No.: 12/647,606

(22) Filed: Dec. 28, 2009

(65) Prior Publication Data
US 2011/0156516 A1 Jun. 30, 2011

(51) Int. Cl.
*H02K 5/16* (2006.01)
*H02K 7/08* (2006.01)

(52) U.S. Cl. .......... 310/90; 310/67 R; 384/247; 384/207

(58) Field of Classification Search .................... 310/90, 310/67 R; 384/247; *H02K 5/16, 7/08*
See application file for complete search history.

(56) References Cited

U.S. PATENT DOCUMENTS

| | | | | |
|---|---|---|---|---|
| 1,595,744 | A * | 8/1926 | Trumpler | 384/286 |
| 5,357,163 | A * | 10/1994 | Minakuchi et al. | 310/90 |
| 7,002,272 | B2 * | 2/2006 | Tsuchiya | 310/85 |
| 7,224,092 | B2 * | 5/2007 | Masuda et al. | 310/67 R |
| 2002/0074879 | A1 * | 6/2002 | Jun | 310/90 |
| 2003/0042811 | A1 | 3/2003 | Lin | |
| 2007/0046118 | A1 * | 3/2007 | Hsieh | 310/90 |
| 2007/0252459 | A1 * | 11/2007 | Yeh et al. | 310/90 |
| 2008/0218017 | A1 * | 9/2008 | Lin | 310/90 |
| 2008/0218019 | A1 * | 9/2008 | Sumi | 310/90 |
| 2008/0309183 | A1 * | 12/2008 | Murakami et al. | 310/90 |
| 2009/0160277 | A1 * | 6/2009 | Obara | 310/90 |
| 2009/0309439 | A1 * | 12/2009 | Yamamoto | 310/90 |
| 2010/0148608 | A1 * | 6/2010 | Kim et al. | 310/90 |
| 2010/0231074 | A1 * | 9/2010 | Yamashita et al. | 310/90 |

FOREIGN PATENT DOCUMENTS

TW 384947 3/2000

* cited by examiner

*Primary Examiner* — Quyen Leung
*Assistant Examiner* — Terrance Kenerly
(74) *Attorney, Agent, or Firm* — Alan Kamrath; Kamrath IP Lawfirm, PA

(57) ABSTRACT

A motor includes a base, a stator and a rotor. The base is equipped with a non-metal shaft tube having an outer circumferential wall and an inner circumferential wall opposite to the outer circumferential wall. An opening is formed on an end of the non-metal shaft tube. At least one bearing is fitted inside the non-metal shaft tube and has an axial hole. A plurality of close-fitting portions is formed between an outer circumferential surface of the bearing and the inner circumferential wall of the non-metal shaft tube. An adjustment gap is formed between each two adjacent close-fitting portions within a circumference of the non-metal shaft tube. The stator is equipped on the base. The rotor has a shaft coupled with the axial hole of the at least one bearing.

26 Claims, 7 Drawing Sheets

MOTOR HAVING RADIAL ADJUSTMENT AND BUFFER GAPS

BACKGROUND OF THE INVENTION

1. Field of the Invention

The present invention relates to a motor and, more particularly, to a motor having a non-metal shaft tube.

2. Description of the Related Art

Modern available motors are mainly categorized as having either a metal or a plastic shaft tube. Referring to FIG. 1, Taiwan Patent Publication No. 384947 discloses a motor having a metal shaft tube. In FIG. 1, a motor 7 comprises a metal shaft tube 71 mounted on a casing seat 72, as well as a stator seat 73 closely fitted to an outer circumferential wall of the metal shaft tube 71. A plurality of bearings 74 is equipped inside the metal shaft tube 71, and a rotor 75 is coupled to the bearings 74.

However, it is difficult to manufacture and process the motor 7. Besides, additional manpower is required to mount the metal shaft tube 71 on the casing seat 72, making it costly to produce the motor 7.

Referring to FIG. 2, a motor having a plastic shaft tube is disclosed. The motor 8 mainly comprises a base 81, a stator 82 and a rotor 83. The base 81 has a plastic shaft tube 811 with a bearing 812 equipped therein. The stator 82 is coupled with an outer circumferential surface of the plastic shaft tube 811. The rotor 83 is rotatably coupled with the bearing 812. Based on this, the stator 82 is capable of driving the rotor 83.

The plastic shaft tube 811 of the motor 8 may be integrally manufactured in a manner of injection molding, which is particularly advantageous over the motor 7 in terms of manufacturing, assembly and cost. Although the motor 8 does not have the problems presented by the motor 7, other problems are raised. Specifically, during assembly, the plastic shaft tube 811 and the bearing 812 are coupled with each other in a close fitting manner. If the plastic shaft tube 811 and the bearing 812 are excessively fitted with each other, the bearing 812 will be excessively compressed by the plastic shaft tube 811, causing the bearing 812 to be damaged, deformed, shifted, etc. As a result, the lifespan of the motor 8 is reduced.

To avoid the above potential problems of the motor 8, Taiwan Patent Publication No. 519259 discloses a motor as shown in FIG. 3. In FIG. 3, a traditional motor 9 comprises an axial seat 91 having a cannular groove 911 formed thereon. Based on this, an inner circular wall 912 and an outer circular wall 913 are formed on the axial seat 91. The inner circular wall 912 is provided to receive a bearing 92, and the outer circular wall 913 is provided to fit a stator seat 93. A baffle ring 94 is fitted in the cannular groove 911. In this way, the baffle ring 94 may support the outer circular wall 913, preventing the bearing 92 from being excessively compressed by the axial seat 91 when the axial seat 91 is deformed. However, the structure of the axial seat 91 is somewhat complex, making it difficult to mold the axial seat 91. Therefore, there is a need to overcome the problem.

SUMMARY OF THE INVENTION

It is therefore the primary objective of this invention to provide a motor in which the bearing is prevented from being excessively compressed by the non-metal shaft tube during assembly.

It is therefore the secondary objective of this invention to provide a simple-structured motor in which the bearing is prevented from being excessively compressed by the non-metal shaft tube.

A motor comprises a base, a stator and a rotor. The base is equipped with a non-metal shaft tube having an outer circumferential wall and an inner circumferential wall opposite to the outer circumferential wall. An opening is formed on an end of the non-metal shaft tube. At least one bearing is fitted inside the non-metal shaft tube and has an axial hole. A plurality of close-fitting portions is formed between an outer circumferential surface of the bearing and the inner circumferential wall of the non-metal shaft tube. An adjustment gap is formed between each two adjacent close-fitting portions within a circumference of the non-metal shaft tube. The stator is equipped on the base. The rotor has a shaft coupled with the axial hole of the at least one bearing.

A motor comprises a base, a stator and a rotor. The base is equipped with a non-metal shaft tube. A bearing is fitted inside the non-metal shaft tube, and the bearing has an axial hole. The stator is equipped on the base. The rotor has a shaft coupled with the axial hole of the bearing. A buffering gap is formed between a circumferential surface of the axial hole of the bearing and an outer circumferential surface of the shaft.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
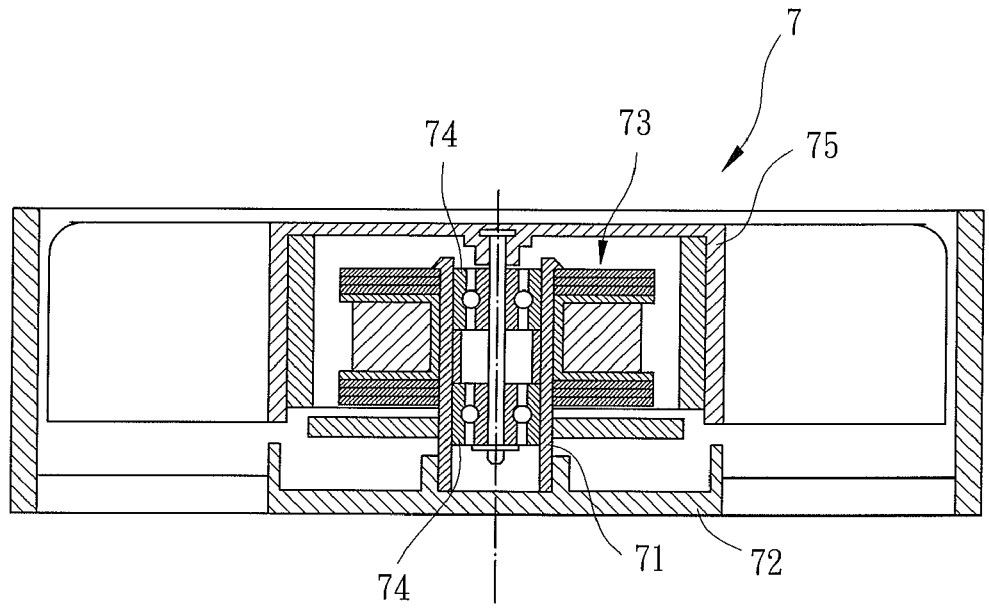
FIG. 1 shows a structure of a traditional motor having a metal shaft tube.
Figure 2:
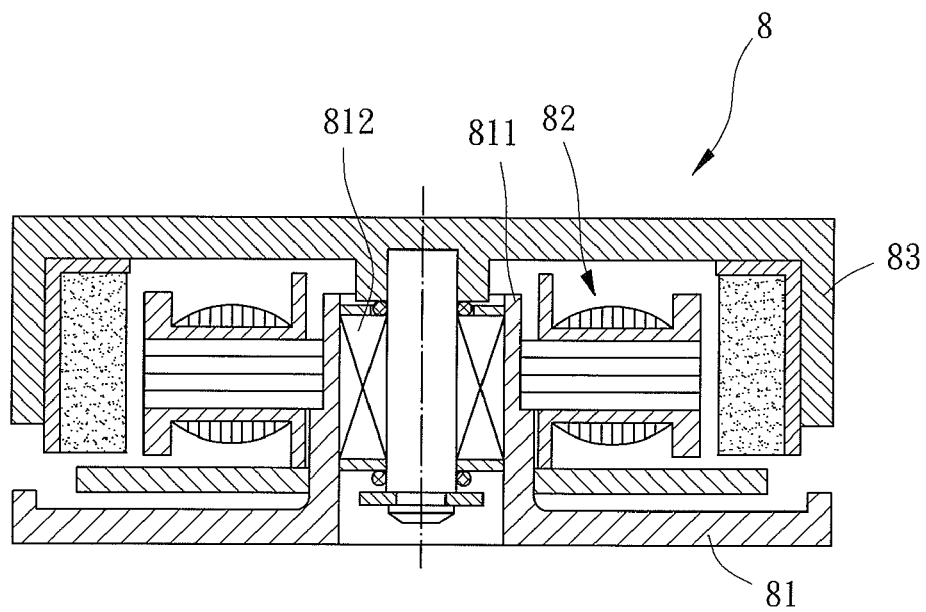
FIG. 2 shows a structure of a traditional motor having a plastic shaft tube.
Figure 3:
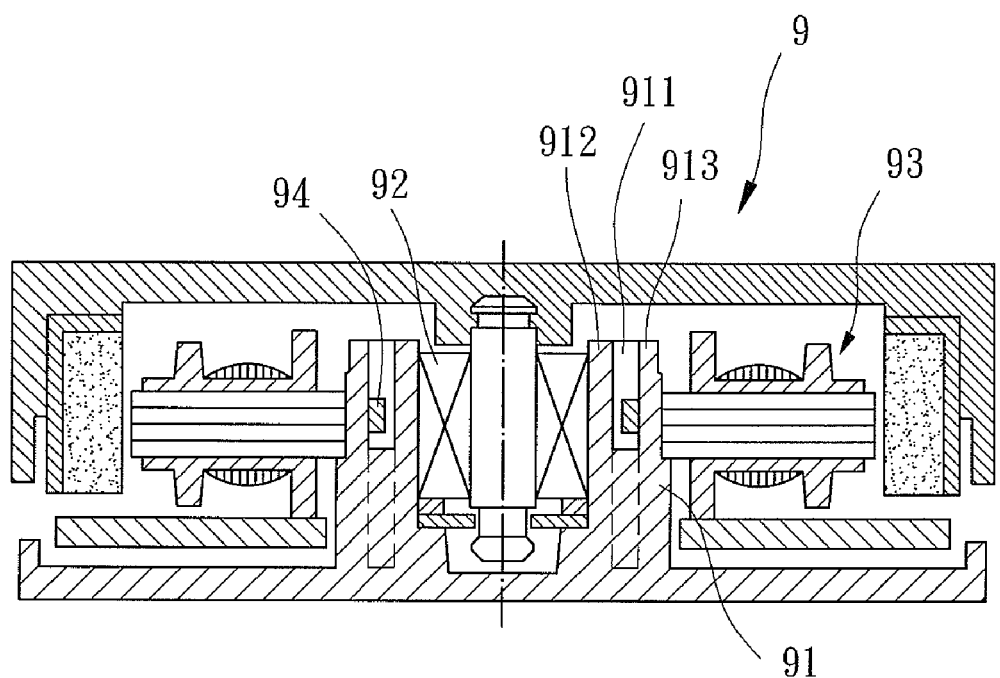
FIG. 3 shows a structure of another traditional motor.

In the various figures of the drawings, the same numerals designate the same or similar parts. Furthermore, when the terms "first", "second", "inner", "outer" "top", "bottom" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 4:
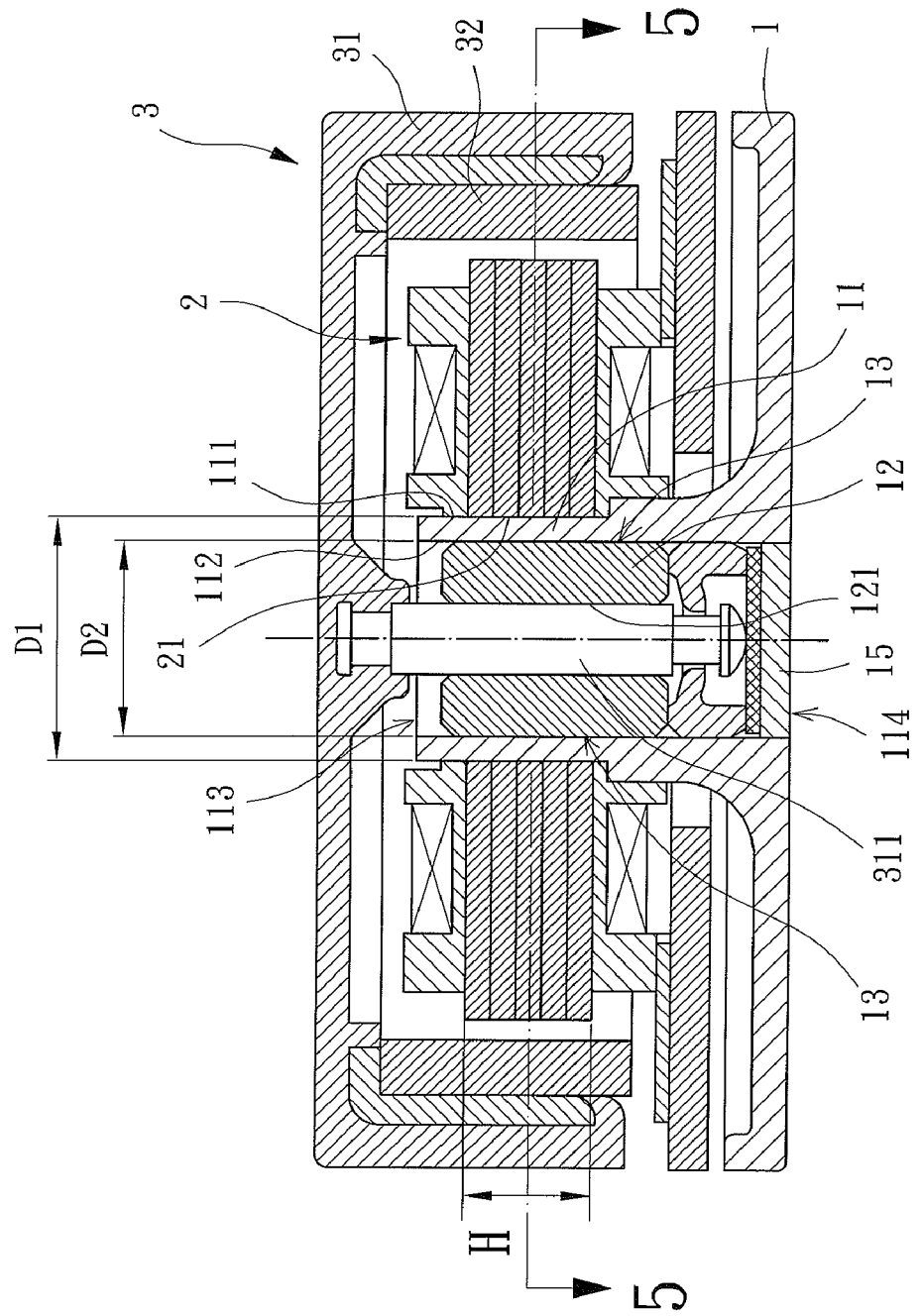
FIG. 4 shows a structure of a motor according to a first embodiment of the invention.

Referring to FIG. 4, a motor according to a first embodiment of the invention comprises at least a base 1, a stator 2 and a rotor 3. The base 1 is provided to mount the stator 2 and the rotor 3, and the stator 2 is used to drive the rotor 3.

The base 1 is mounted with a non-metal shaft tube 11, which preferably is a plastic shaft tube. The non-metal shaft tube 11 has an outer circumferential wall 111 and an inner circumferential wall 112 opposite to the outer circumferential wall 111, with a cylindrical chamber formed in the non-metal shaft tube 11. An opening 113 is formed on a side of the non-metal shaft tube 11 and communicates with the cylindrical chamber. At least one bearing 12 is received in the cylindrical chamber of the non-metal shaft tube 11. The bearing 12 may be settled into the cylindrical chamber and coupled with the inner circumferential wall 112 of the non-metal shaft tube 11 via the opening 113. In the embodiment of FIG. 4, the number of the bearing 12 is 1, and the bearing 12 has an axial hole 121.

Figure 5:
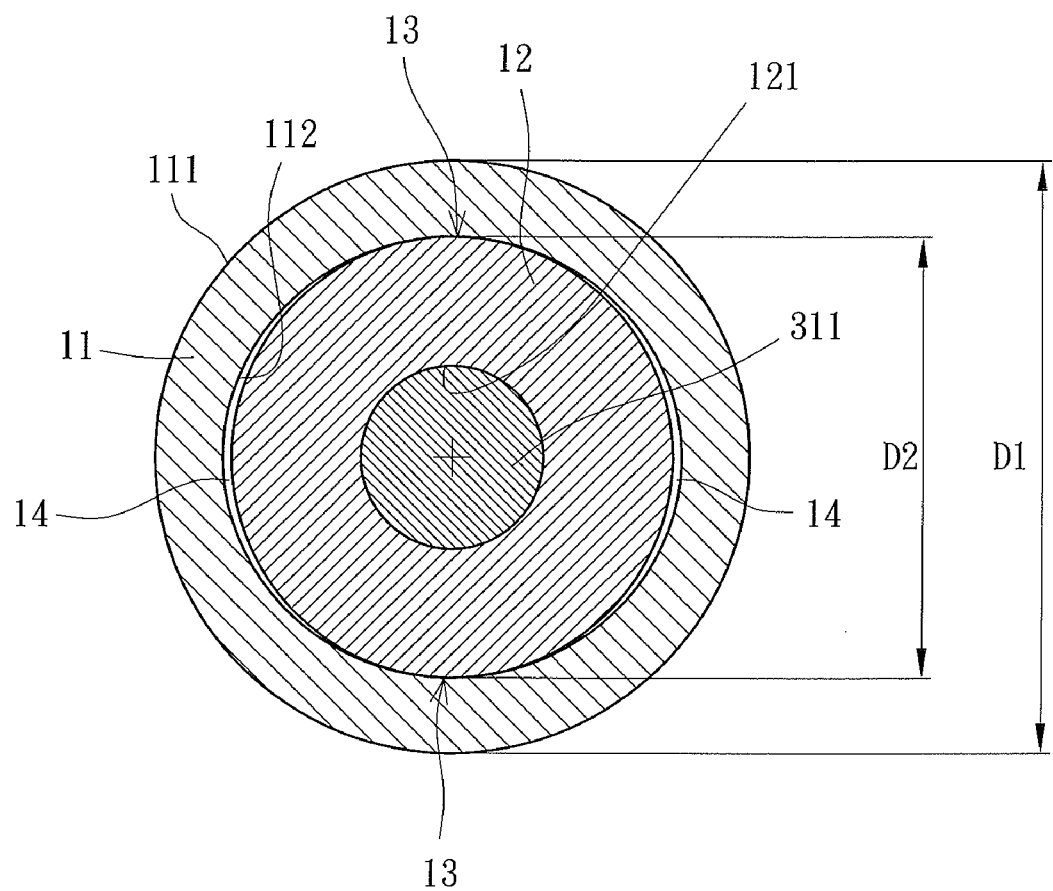
FIG. 5 shows a cross sectional view of the motor according to a section line 5-5 of FIG. 4.

Specifically, referring to FIG. 5, there is a plurality of close-fitting portions 13 between the outer circumferential surface of the bearing 12 and the inner circumferential wall 112 of the non-metal shaft tube 11, allowing the bearing 12 to be closely fitted with the non-metal shaft tube 11. Furthermore, within the circumference of the non-metal shaft tube 11, there is an adjustment gap 14 between each two adjacent close-fitting portions 13.

The stator 2 is mounted on the base 1 and has an assembly hole 21 which allows the non-metal shaft tube 11 to be fitted therethrough. In the embodiment, the stator 2 is provided to drive the rotor 3. The stator 2 may be composed of elements such as silicon steel plates, a coil and isolation components (not indicated).

The rotor 3 comprises a hub 31 and a permanent magnet 32. The hub 31 has a shaft 311 rotatably coupled within the axial hole 121 of the bearing 12. The permanent magnet 32 is an annual magnet coupled with an inner circumference wall of the hub 31. There is an air gap between the permanent magnet 32 and the stator 2.

During operation of the motor, the stator 2 generates an alternating magnetic field including magnetic flux flowing in the air gap, causing the stator 2 to react with the permanent magnet 32 via the alternating magnetic field, thus making the rotor 3 rotate.

The motor of the invention is characterized by the bearing 12 disposed inside the non-metal shaft tube 11 in a close-fitting manner via the close-fitting portions 13 formed between the non-metal shaft tube 11 and the bearing 12, thereby positioning the bearing 12 efficiently. In this manner, the positioning of the bearing 12 and the shaft 311 would be better. More importantly, although the bearing 12 and the non-metal shaft tube 11 are closely fitted with each other, the bearing 12 may be prevented from being excessively compressed by the non-metal shaft tube 11 via the adjustment gap 14 between each two adjacent close-fitting portions 13, thus avoiding deformation, damaging or shifting of the bearing 12. Moreover, when the non-metal shaft tube 11 is deformed due to the hot-swelling and cool-shrinking effect, the bearing 12 may be prevented from being over-compressed by the non-metal shaft tube 11 via the buffering effect provided by the adjustment gaps 14. Overall, any of the adjustment gaps 14 between any two adjacent close-fitting portions 13 may provide the space flexibility for the non-metal shaft tube 11 when the non-metal shaft tube 11 is deformed due to an unwanted event Referring to FIGS. 4 and 5, based on the motor structure described above, the motor may be further improved by including one or more following features or any combination thereof, as elaborated below.

The non-metal shaft tube 11 has an outer tube diameter (D1) in a radial direction thereof. A minimal diameter of the assembly hole 21 of the stator 2 may be slightly smaller than the outer tube diameter (D1) of the non-metal shaft tube 11. The ratio of the minimal diameter of the assembly hole 21 to the outer tube diameter (D1) of the non-metal shaft tube 11 is preferably between 0.96 and 0.999. Based on this, the stator 2 may be fitted with the non-metal shaft tube 11 in a close-fitting manner when the stator 2 is fitted with the outer circumferential wall 111 of the non-metal shaft tube 11, thereby allowing the stator 2 and the non-metal shaft tube 11 to be better fitted. Moreover, as the stator 2 is closely fitted with the non-metal shaft tube 11 so that the non-metal shaft tube 11 is deformed due to the excessive compression of the stator 2, the deformed portions of the non-metal shaft tube 11 will not affect the bearing 12, because the adjustment gaps 14 may provide the space flexibility for the deformation of the non-metal shaft tube 11. Thus, the adjustment gaps 14 formed between the close-fitting portions 13 may also provide the space flexibility for the deformation of the non-metal shaft tube 11 when the stator 2 is closely fitted with the non-metal shaft tube 11.

Preferably, the adjustment gaps 14 are axially extended between the inner circumferential wall 112 of the non-metal shaft tube 11 and the outer circumferential surface of the bearing 12. As shown in FIG. 4, a contact interface with an axial height (H), where the assembly hole 21 of the stator 2 is closely fitted with the non-metal shaft tube 11, is formed. Based on this, the axial extension range of the adjustment gaps 14 may be aligned with the axial height (H). Therefore, the adjustment gaps 14 may provide the space flexibility for the deformed portions of the non-metal shaft tube 11 when the non-metal shaft tube 11 is deformed due to the excessive compression of the stator 2.

An enclosed portion 114 may be formed on another end of the non-metal shaft tube 11. The enclosed portion 114 may be formed using a supporting member 15 coupled with the inner part of another end of the non-metal shaft tube 11, as shown in FIG. 4. In another preferred case, the non-metal shaft tube 11 on the base 1, in an injection molding manner, may integrally form a blind hole serving as the cylindrical chamber. Namely, the enclosed portion 114 can be integrally formed on another end of the non-metal shaft tube 11, which thus provides a dust-proof function and may still limit the deformation of another end of the non-metal shaft tube 11 when the stator 2 and the non-metal shaft tube 11 are excessively fitted with each other.

A side of the enclosed portion 114 inside the non-metal shaft tube 11 may have a plane surface. Based on this, the shaft 311 may be positioned more easily during assembly, providing a better perpendicularity of the shaft 311.

The non-metal shaft tube 11 has an inner tube diameter (D2) in a radial direction thereof, with the inner tube diameter (D2) referring to the distance between any two opposing close-fitting portions 13. The ratio of the inner tube diameter (D2) to the maximal diameter of the outer circumferential surface of the bearing 12 is preferably between 0.96 and 0.999, allowing the close-fitting portions 13 to be formed between the non-metal shaft tube 11 and the bearing 12. The non-metal shaft tube 11 is sandwiched between the stator 2 and bearing 12 in a better close-fitting manner when the ratio of the minimal diameter of the assembly hole 21 to the outer tube diameter (D1) of the non-metal shaft tube 11 is between 0.96 and 0.999, which also efficiently prevents the bearing 12 from being excessively compressed by the non-metal shaft tube 11.

Figure 6:
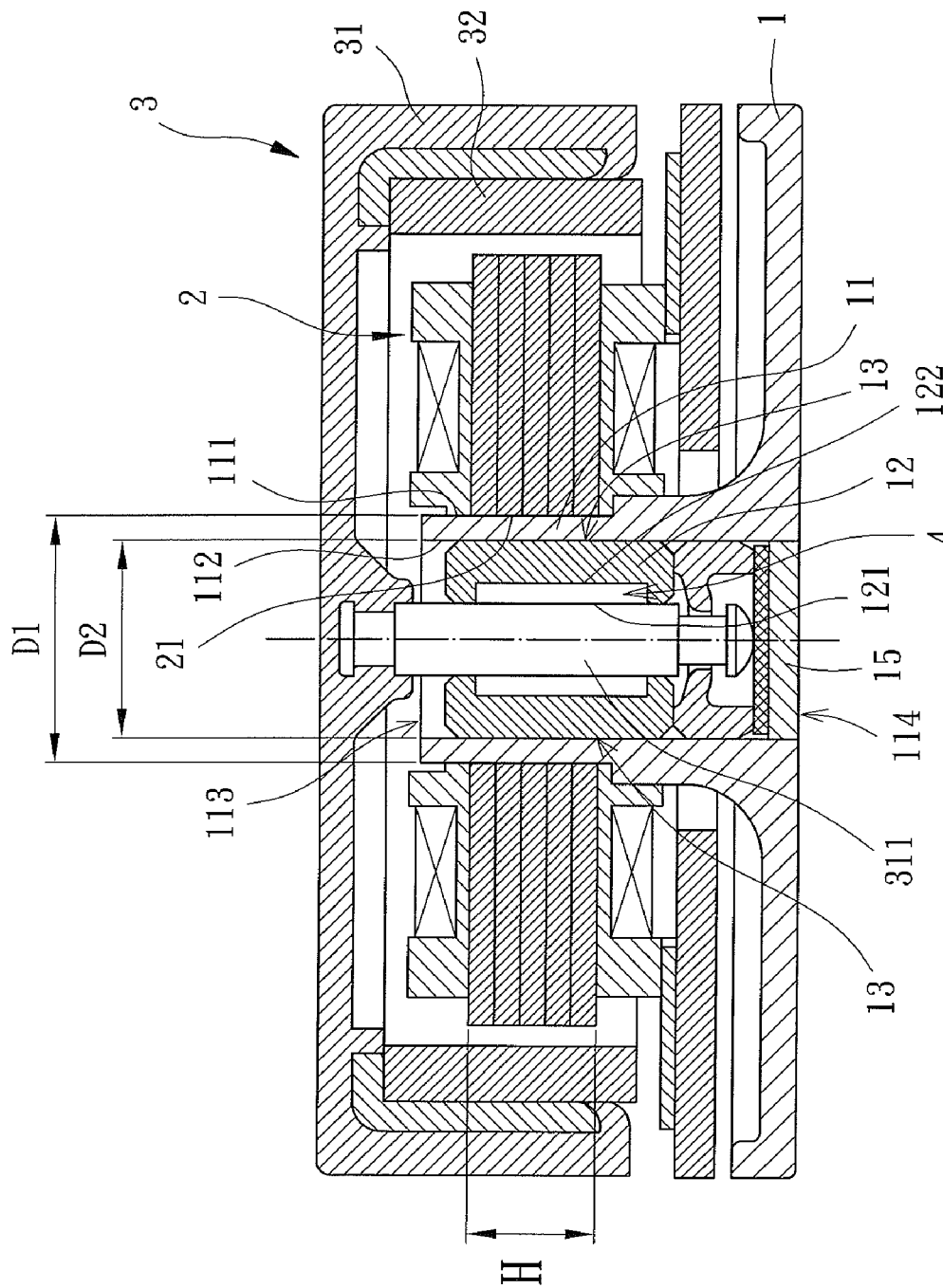
FIG. 6 shows a structure of a motor according to a second embodiment of the invention.
Figure 7:
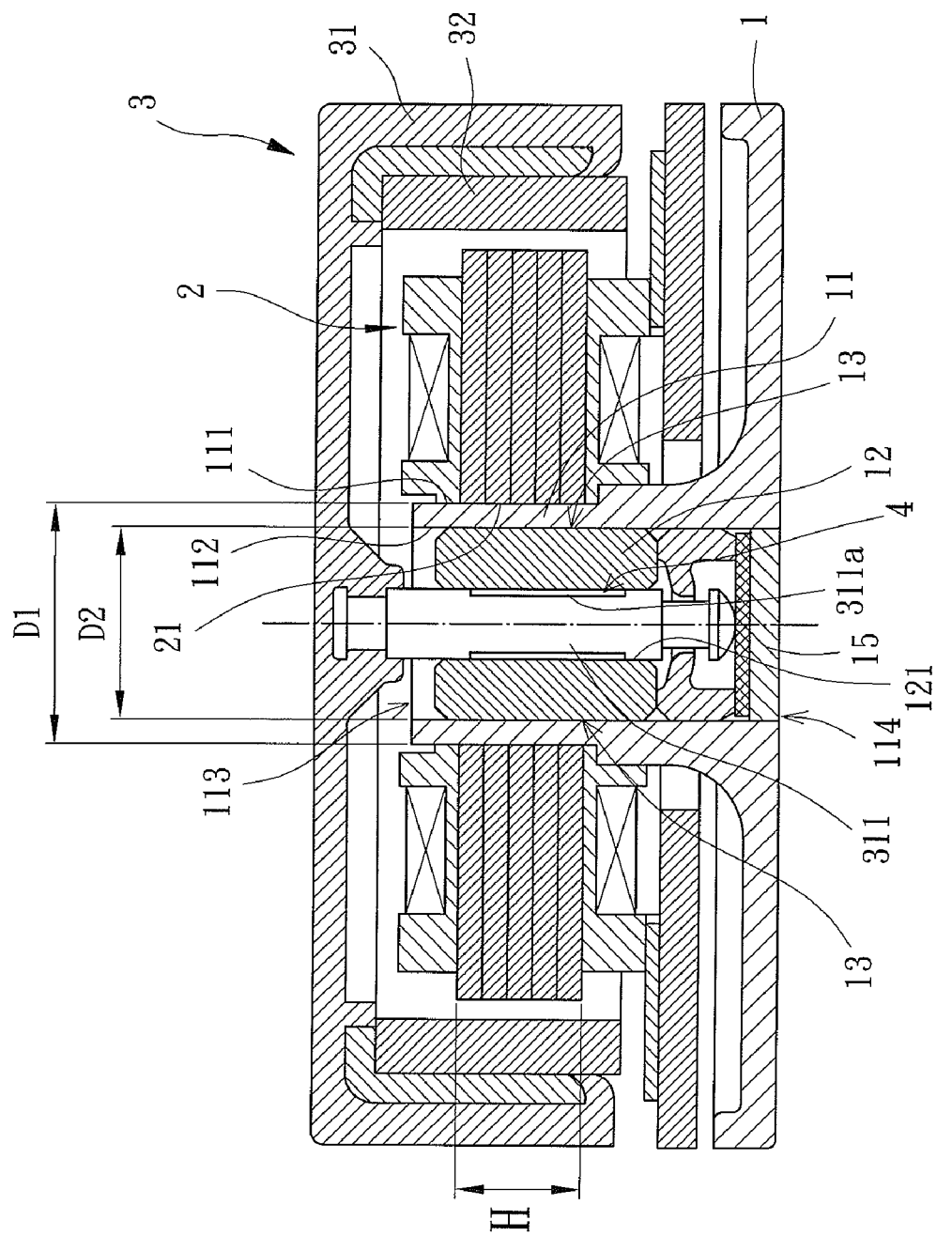
FIG. 7 shows another structure of a motor according to the second embodiment of the invention.

Referring to FIGS. 6 and 7, a motor according to a second embodiment of the invention is disclosed. The motor in the second embodiment is different from that in the first embodiment by a buffering gap 4 formed between the circumferential surface of the axial hole 121 of the bearing 12 and the outer circumferential surface of the shaft 311 of the rotor 3. The ratio of the diameter of the axial hole 121 of the bearing 12 to the diameter of the shaft 311 is preferably, for example, between 1.001 and 1.03 to form the buffering gap 4. Based on this, the buffering gap 4 may provide a buffering effect for the bearing 12 when the bearing 12 is excessively compressed by the non-metal shaft tube 11, thus avoiding deformation, damaging or shifting of the bearing 12. Furthermore, the buffering gap 4 is preferably axially extended between the circumferential surface of the axial hole 121 of the bearing 12 and the outer circumferential surface of the shaft 311. As shown in FIG. 6, a contact interface with an axial height (H), where the assembly hole 21 of the stator 2 is closely fitted with the non-metal shaft tube 11, is formed. Based on this, the axial extension range of the buffering gap 4 may be aligned with the axial height (H). Therefore, the buffering gap 4 may provide the space flexibility for the deformed portions of the non-metal shaft tube 11 when the non-metal shaft tube 11 is deformed due to the compression of the stator 2.

Specifically, as shown in FIG. 6, an inner groove 122 may be formed on the circumferential surface of the axial hole 121 of the bearing 12. The inner groove 122 may serve as the buffering gap 4. In another case, as shown in FIG. 7, an outer groove 311a may be formed on the outer circumferential surface of the shaft 311. The outer groove 311a is aligned with the bearing 12 to form the buffering gap 4.

Note the various secondary features previously described may also apply to the motor of the second embodiment. The ideas of close-fitting portions 13 and adjustment gap 14 disclosed in the first embodiment may also be incorporated into the second embodiment, making the bearing 12 of the second embodiment less likely to be deformed, damaged or shifted when subjected to the compression of the non-metal shaft tube 11. Also, the motor of the second embodiment may achieve the same buffering effect using only the buffering gap 4 without the close-fitting portions 13 and the adjustment gap 14.

Figure 8:
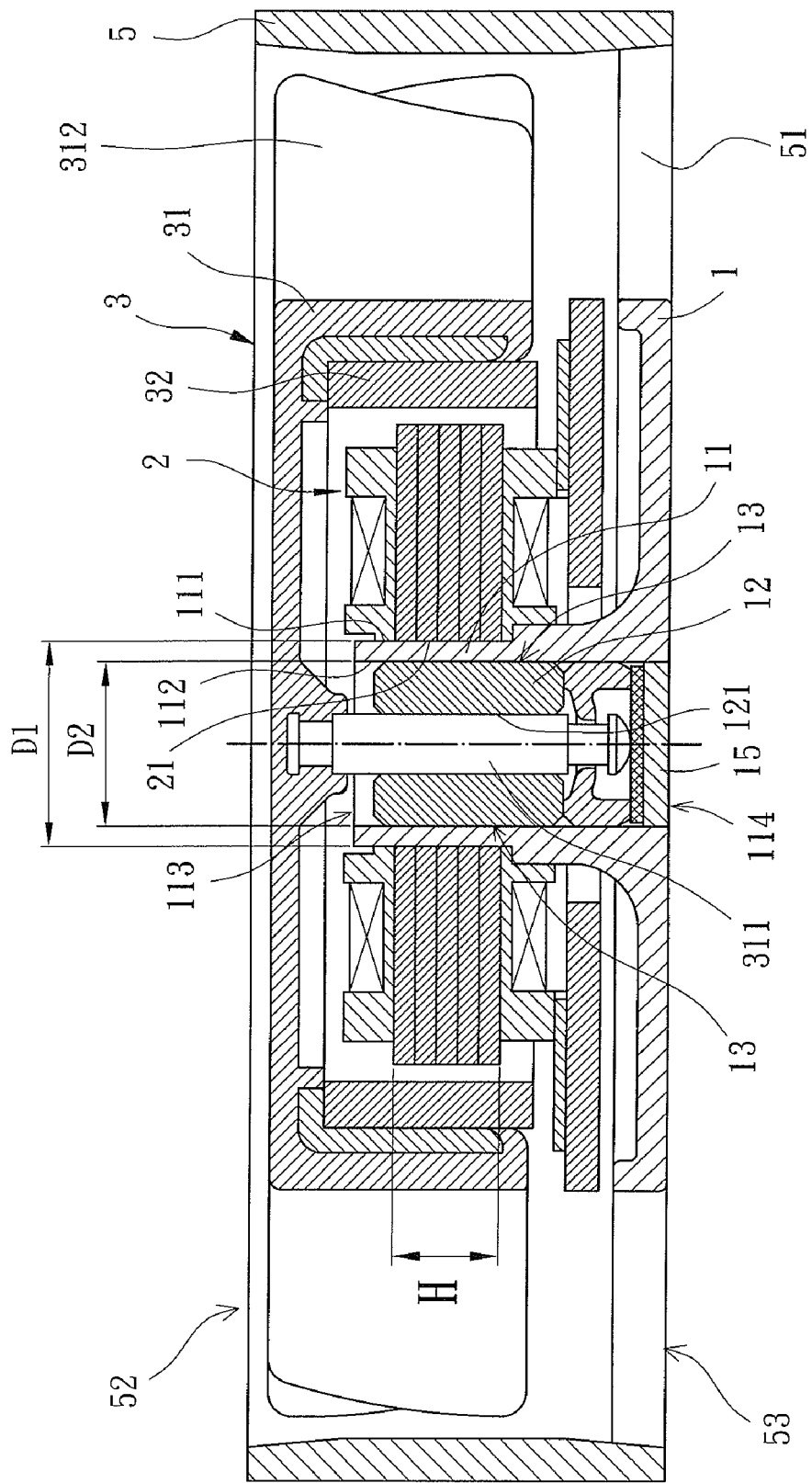
FIG. 8 shows a structure of an axial flow fan with the motor.

The motor disclosed in the first and second embodiments may be applied to a heat-dissipating fan, such as an air-blowing fan or an axial flow fan. Referring to FIG. 8, an axial flow fan with the motor (take the motor of the first embodiment as an example) is disclosed. A frame structure of a fan, which has an air inlet 52 and an air outlet 53, may be formed by coupling the base 1 to a frame body 5 via a plurality of connection members 51 (such as ribs or stationary blades). A plurality of blades 312 may be radially extended from the hub 31 of the rotor 3. Based on this, the heat-dissipating fan may be equipped in various electronic devices or instruments. During operation of the rotor 3, air is drawn into the heat-dissipating fan by the blades 312 via the air inlet 52, and discharged from the heat-dissipating fan to a heat source via the air outlet 53, thereby achieving heat dissipating.

According to the above description, at least one of the adjustment gap 14 and the buffering gap 4 may be configured to provide the space flexibility for the deformation of the non-metal shaft tube 11, thereby avoiding deformation, damaging or shifting of the bearing 12 when subjected to the compression of the non-metal shaft tube 11 during assembly of the motor. In this way, deformation, damaging or shifting of the bearing 12 may be avoided, and convenience of assembly is also increased, thus achieving advantages such as prolonging lifespan, decreasing noise and improving the quality of the motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
  a base equipped with a non-metal shaft tube having an outer circumferential wall, wherein the non-metal shaft tube has an outer tube diameter in a radial direction of the non-metal shaft tube;
  a bearing fitted inside the non-metal shaft tube and having an axial hole;
  a stator having an assembly hole coupled with the outer circumferential wall of the non-metal shaft tube, wherein a minimal diameter of the assembly hole is smaller than the outer tube diameter of the non-metal shaft tube, wherein the ratio of the minimal diameter of the assembly hole of the stator to the outer tube diameter of the non-metal shaft tube is between 0.96 and 0.999; and
  a rotor having a shaft coupled within the axial hole of the bearing.

2. The motor as claimed in claim 1, wherein the non-metal shaft tube has an inner tube diameter in a radial direction thereof, and wherein the ratio of the inner tube diameter to a maximal diameter of the outer circumferential surface of the bearing is between 0.96 and 0.999 to form the plurality of close-fitting portions.

3. The motor as claimed in claim 1, wherein the base is coupled to a frame body via a plurality of connection members to form a frame structure with an air inlet and an air outlet, and wherein a plurality of blades is radially extended from the rotor.

4. The motor of claim 1, wherein a buffering gap is formed between a circumferential surface of the axial hole of the bearing and an outer circumferential surface of the shaft.

5. The motor as claimed in claim 4, wherein the buffering gap is an inner groove formed on the circumferential surface of the axial hole of the bearing.

6. The motor as claimed in claim 4, wherein the buffering gap is an outer groove formed on the outer circumferential surface of the shaft.

7. The motor as claimed in claim 4, wherein the ratio of a diameter of the axial hole of the bearing to a diameter of the shaft is between 1.001 and 1.03 to form the buffering gap.

8. The motor as claimed in claim 4, wherein the buffering gap is axially extended between the circumferential surface of the axial hole of the bearing and the outer circumferential surface of the shaft of the rotor, the stator is closely fitted with the non-metal shaft tube, a contact interface where the stator is closely fitted with the non-metal shaft tube is formed and the contact interface has an axial height, and the axial extension range of the buffering gap is aligned with the axial height.

9. The motor as claimed in claim 1, wherein the non-metal shaft tube has an inner circumferential wall opposite to the outer circumferential wall, wherein an opening is formed on an end of the non-metal shaft tube, wherein a plurality of close-fitting portions is formed between an outer circumferential surface of the bearing and the inner circumferential wall of the non-metal shaft tube, wherein an adjustment gap is formed between each two adjacent close-fitting portions within a circumference of the non-metal shaft tube.

10. The motor as claimed in claim 9, wherein a buffering gap is formed between a circumferential surface of the axial hole of the bearing and the shaft of the rotor.

11. The motor as claimed in claim 10, wherein the buffering gap is an inner groove formed on the circumferential surface of the axial hole of the bearing.

12. The motor as claimed in claim 10, wherein the buffering gap is an outer groove formed on an outer circumferential surface of the shaft.

13. The motor as claimed in claim 10, wherein the ratio of a diameter of the axial hole of the bearing to a diameter of the shaft is between 1.001 and 1.03 to form the buffering gap.

14. The motor as claimed in claim 9, wherein an enclosed portion is formed on another end of the non-metal shaft tube.

15. The motor as claimed in claim 14, wherein the enclosed portion is a blind hole formed on the other end of the non-metal shaft tube.

16. The motor as claimed in claim 14, wherein the enclosed portion is formed using a supporting member coupled with the inner part of the other end of the non-metal shaft tube.

17. The motor as claimed in claim 14, wherein a side of the enclosed portion inside the non-metal shaft tube is a plane surface.

18. A motor comprising:
a base equipped with a non-metal shaft tube having an inner circumferential wall, wherein the non-metal shaft tube has an inner tube diameter in a radial direction thereof;
a bearing fitted inside the non-metal shaft tube and having an axial hole, wherein a plurality of close-fitting portions is formed between an outer circumferential surface of the bearing and the inner circumferential wall of the non-metal shaft tube, wherein the ratio of the inner tube diameter to a maximal diameter of the outer circumferential surface of the bearing is between 0.96 and 0.999 to form the plurality of close-fitting portions;
a stator coupled with the non-metal shaft tube; and
a rotor having a shaft coupled within the axial hole of the bearing.

19. The motor as claimed in claim 18, wherein the non-metal shaft tube has an outer circumferential wall opposite to the inner circumferential wall, wherein an opening is formed on an end of the non-metal shaft tube, wherein an adjustment gap is formed between each two adjacent close-fitting portions within a circumference of the non-metal shaft tube.

20. The motor as claimed in claim 19, wherein the non-metal shaft tube has an outer tube diameter in a radial direction of the non-metal shaft tube, wherein the stator has an assembly hole coupled with the outer circumferential wall of the non-metal shaft tube, and wherein a minimal diameter of the assembly hole is smaller than the outer tube diameter of the non-metal shaft tube.

21. The motor as claimed in claim 20, wherein the adjustment gap is axially extended between the inner circumferential wall of the non-metal shaft tube and the outer circumferential surface of the bearing, wherein a contact interface where the assembly hole of the stator is closely fitted with the non-metal shaft tube is formed, wherein the contact interface has an axial height, and wherein the axial extension range of the adjustment gap is aligned with the axial height.

22. The motor as claimed in claim 18, wherein the non-metal shaft tube has an outer tube diameter in a radial direction of the non-metal shaft tube, with the stator having an assembly hole coupled with the outer circumferential wall of the non-metal shaft tube, with a minimal diameter of the assembly hole being smaller than the outer tube diameter of the non-metal shaft tube, wherein a buffering gap is formed between a circumferential surface of the axial hole of the bearing and an outer circumferential surface of the shaft.

23. The motor as claimed in claim 22, wherein the buffering gap is an inner groove formed on the circumferential surface of the axial hole of the bearing.

24. The motor as claimed in claim 22, wherein the buffering gap is an outer groove formed on an outer circumferential surface of the shaft.

25. The motor as claimed in claim 22, wherein the ratio of a diameter of the axial hole of the bearing to a diameter of the shaft is between 1.001 and 1.03 to form the buffering gap.

26. The motor as claimed in claim 22, wherein the buffering gap is axially extended between the circumferential surface of the axial hole of the bearing and the outer circumferential surface of the shaft of the rotor, the stator is closely fitted with the non-metal shaft tube, a contact interface where the stator is closely fitted with the non-metal shaft tube is formed and the contact interface has an axial height, and the axial extension range of the buffering gap is aligned with the axial height.

* * * * *